2,867,028

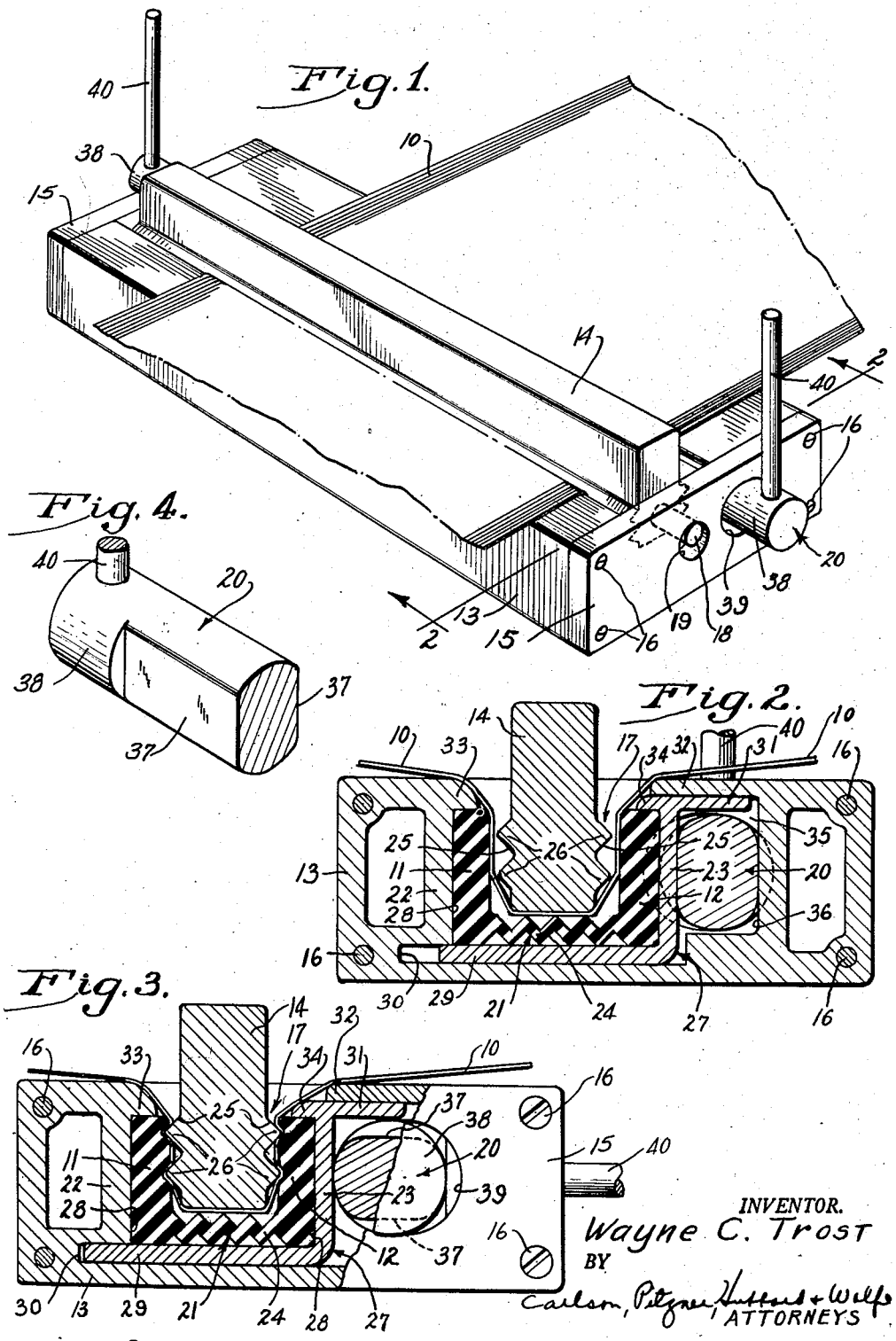
Jan. 6, 1959  W. C. TROST  2,867,028
YARN CLAMP
Filed Oct. 7, 1953
INVENTOR.
Wayne C. Trost
BY
ATTORNEYS United States Patent Office 2,867,028
Patented Jan. 6, 1959

YARN CLAMP

Wayne C. Trost, Rockford, Ill., assignor to Barber-Colman Company, Rockford, Ill., a corporation of Illinois Application October 7, 1953, Serial No. 384,649

1 Claim. (Cl. 24—262)

This invention relates to a yarn clamp such as is used to grip and hold the threads of a warp sheet and, more particularly, to a clamp of the type in which the threads are snubbed around an elongated insertion bar and are gripped by elongated jaws pressing against the sides of the bar.

The general object is to provide a new and improved clamp of the above character which holds the threads securely, which may be used for a wide variety of thread sizes and which, at the same time, is simple in construction, easy to assemble and inexpensive to manufacture.

A more detailed object is to form the jaws from elongated strips of a resilient material so that the strips, when moved toward each other, are compressed against the insertion bar and grip the threads firmly.

The invention also resides in the novel construction of the insertion bar and in the arrangement of the actuating mechanism for moving the jaws to open and close the clamp.

Other objects and advantages of the invention will become apparent from the following detailed description taken in connection with the accompanying drawings, in which Figure 1 is a perspective view of a yarn clamp embodying the novel features of the present invention.

Fig. 2 is a sectional view taken along the line 2—2 in Fig. 1 and showing the clamp in the open position.

Fig. 3 is a view similar to Fig. 2 but showing the clamp closed.

Fig. 4 is an enlarged fragmentary perspective view of the actuator for opening and closing the clamp.

As shown in the drawings for purposes of illustration, the invention is embodied in a clamp for holding the threads of a warp sheet 10 while various textile operations, such as the tying of the threads of one sheet to the threads of another sheet, are performed. Clamps of this type usually employ a pair of elongated opposed jaws 11 and 12 mounted on a frame or base 13 for relative movement toward each other and into gripping engagement with the sides of an elongated insertion bar 14 received between the jaws to clamp the warp threads which are snubbed around the bar. The base 13 is a hollow block supporting the jaws and the operating mechanism and is closed at each end by rectangular plates 15 suitably fastened to the blocks as by screws 16.

In clamping the warp threads, the jaws 11 and 12 are moved apart to expand the channel 17 defined by the jaws to a size large enough to receive the insertion bar 14. The threads then are laid over the top of the base 13 across the channel 17 and one end of the insertion bar is inserted in the channel. A pin 18 projecting longitudinally from this end of the bar projects into a hole 19 in one of the end plates 15 and holds the bar end in place while the bar is swung down into the channel 17. With the parts in this position as shown in Fig. 2, the warp threads are snubbed around the insertion bar. The jaws 11 and 12 then are moved by an actuator 20 into gripping engagement with the sides of the insertion bar thus clamping the threads between the jaws and the bar.

According to the present invention, the jaws 11 and 12 are constructed and actuated in a novel manner to adapt the clamp for a wide variety of thread sizes and at the same time, to simplify the manufacture and assembly and reduce the overall cost. To this end, the jaws are in the form of strips which are composed of a resilient material such as soft rubber and which, when moved by the actuator 20, are compressed against the sides of the insertion bar 14 to grip the threads of the warp sheet securely. Preferably, the jaws are molded as a unitary piece 21 and are supported on the base of the clamp by relatively movable parts 22 and 23 which serve as rigid backings for the resilient jaws. The actuator 20 is operatively connected to the backing members 22 and 23 and shifts the latter toward each other to press the jaws against the insertion bar.

In the present instance, the piece 21 forming the jaws 11 and 12 is an elongated rubber strip of channel or U-shaped cross section so that the legs of the U constitute the jaws which thus are joined at their inner ends by a crosspiece 24. The latter, being yieldable, resiliently urges the jaws against their respective backing members 22 and 23 while permitting the jaws to move together. In order that the crosspiece 24 contracts easily when the clamp is closed, it may be corrugated as shown in the drawings.

When the clamp is closed, the jaws 11 and 12 are compressed against clamping surfaces 25 on the sides of the insertion bar 14 so that the warp threads are gripped between the jaw 11 and the opposing surface on the bar and also between the jaw 12 and the surface on the other side of the bar. To grip the threads more securely, the clamping surfaces 25 are toothed or ribbed and, for this purpose, two ribs 26 project outwardly from each side of the bar and extend longitudinally of the bar and transversely of the threads. When the jaws are compressed against the sides of the insertion bar, they tend to conform to the shape of the ribbed clamping surfaces 25 and bend the threads in and out around the ribs 26 as shown in Fig. 3. Such bending results in a better gripping action and reduces the possibility of the threads slipping between the jaws and the insertion bar.

To mount the jaws 11 and 12 for movement in against the insertion bar 14, the backing members 22 and 23 support the jaws and are movable on the base 13 relatively toward and away from each other. Herein such movement is obtained by forming the backing member 23 as a part of a slide 27 moved by the actuator 20 while the backing member 22 is stationary and rigid with the base. Both backing members are, in effect, long narrow walls facing inwardly toward each other and defining an elongated recess 28 in which the U-shaped jaw piece 21 is received. The slide 27 is Z-shaped in cross section with the lower leg 29 extending under the jaw piece to form the bottom of the recess 28 and projecting into a horizontal slot 30 cut in the base at the lower end of the stationary wall 22. The slot extends the complete length of the clamp and constitutes one guide for the slide 27. The upper leg 31 of the slide projects in under and has a sliding fit with a flange 32 on the top of the base so that this flange serves as a second guide. Short flanges 33 and 34 project in over the jaws 11 and 12 from the upper ends of the walls 22 and 23 and hold the rubber jaw piece 21 in place in the recess 28.

Closing of the clamp is effected by moving the actuator 20 which acts between the base 13 and the jaw 12 through the medium of the slide 27 and shifts the slide inwardly to press the jaws 11 and 12 against the insertion bar 14. Herein the actuator 20 is a cam engaging the back of the movable wall 23 throughout the entire length thereof to obtain a uniform closing action and is disposed in a space 35 (Fig. 2) under the leg 31 of the slide and between the movable wall 23 and an internal wall 36 on the base. Preferably the cam 20 is a bar which extends from one end of the clamp to the other and whose cross section is elongated in one direction. The cam bears against both the walls 23 and 36 so that, when the cam bar is turned through a right angle from the position shown in Fig. 2 in which it is elongated vertically to the position shown in Fig. 3, the slide 27 is shifted inwardly to close the clamp. When the cam is turned back, the yieldable corrugated section 24 of the jaw piece 21 urges the slide back to the clamp open position. A cam of the desired shape may be made by cutting flat surfaces 37 on opposite sides of a round bar. The end portions 38 of the bar project through holes 39 in the end plates 15 of the clamp base 13 where they are accessible for turning the cam bar. Short rods 40 projecting at right angles to the cam bar 20 from the end portions 38 serve as handles to effect such turning.

In using the clamp, the cam bar 20 is turned to the position shown in Fig. 2 in which the bar is elongated in the vertical direction and the clamp is open. The insertion bar 14 is removed from the channel 17 and the warp sheet 10 is stretched across the top of the clamp base 13 over the recess. With the sheet in this position, the end of the insertion bar carrying the pin 18 is inserted in the channel 17 and the pin is projected into the hole 19 in the end plate 15. Then the entire insertion bar is pushed down into the channel so that the sheet is snubbed around the bar. While the insertion bar is held down in the channel, the cam bar is turned through a right angle. Such turning shifts the slide 27 inwardly collapsing the channel and compressing the rubber jaws 11 and 12 against the ribbed clamping surfaces 25 on the sides of the insertion bar. As seen in Fig. 1, the hole 19 is enlarged to permit shifting of the pin 18 and hence of the bar 14 during the closing action. With the jaws pressed against the insertion bar, the warp threads are bent in and out around the ribs 26 and thus are held securely by the clamp.

It will be observed that the clamp described above effectively grips the warp threads and, at the same time, is comparatively simple in construction and inexpensive to manufacture. The jaws 11 and 12 may be composed of a rather soft rubber which permits the clamp to be used for a wide range of yarn sizes and also produces a substantially uniform clamping pressure throughout the length of the clamp even though the warp sheet is quite wide. In addition, the jaws may be made as a single molded rubber piece 21 which merely is inserted in the recess 28 under the flanges 33 and 34 and need not be cemented in place. Similarly, the cam bar 20 is simple in construction since it requires only the machining of the flat surfaces 37 on a round bar.

I claim as my invention:

A yarn clamp comprising a frame having an elongated internal wall, a second and parallel wall opposing said first wall and cooperating with the same to define an elongated recess, means on said frame supporting said walls for relative movement toward and away from each other to collapse and expand said recess, an elongated member of U-shaped cross section composed of a resilient material and disposed within said recess with one leg against each of said walls, the portion of said member connecting said legs being corrugated to yieldably urge the legs against the respective walls while permititng collapse of said recess, an elongated bar insertible in said recess between said legs when the recess is expanded and having clamping surfaces opposing each of said legs, and an actuator connected to said walls and operable to move the walls to collapse said recess and press said legs against said clamping surfaces thereby to grip a thread snubbed around said bar.

References Cited in the file of this patent

UNITED STATES PATENTS

| | | |
|---|---|---|
| 286,024 | Lange | Oct. 2, 1883 |
| 844,178 | Nickless | Feb. 12, 1907 |
| 1,221,894 | Neeley | Apr. 10, 1917 |
| 1,300,482 | Petranich | Apr. 15, 1919 |
| 1,892,841 | Kaufmann | Jan. 3, 1933 |
| 2,063,681 | Jaworski | Dec. 8, 1936 |
| 2,482,155 | Crandall | Sept. 20, 1949 |
| 2,654,132 | Norcross | Oct. 6, 1953 |

FOREIGN PATENTS

| | | |
|---|---|---|
| 12,206 | Great Britain | May 26, 1913 |
| 501,012 | France | Mar. 31, 1920 |